US012063620B2

(12) United States Patent
Wang et al.

(10) Patent No.: US 12,063,620 B2
(45) Date of Patent: Aug. 13, 2024

(54) BLUETOOTH-BASED SPATIAL-TEMPORAL LOCALIZATION

(71) Applicant: Mitsubishi Electric Research Laboratories, Inc., Cambridge, MA (US)

(72) Inventors: Pu Wang, Cambridge, MA (US); Jianyuan Yu, Blacksburg, VA (US); Toshiaki Koike-Akino, Belmont, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 310 days.

(21) Appl. No.: 17/652,527

(22) Filed: Feb. 25, 2022

(65) Prior Publication Data

US 2023/0276394 A1     Aug. 31, 2023

(51) Int. Cl.
*H04W 64/00* (2009.01)
*G01S 5/02* (2010.01)

(52) U.S. Cl.
CPC ........... *H04W 64/00* (2013.01); *G01S 5/0218* (2020.05); *G01S 5/02213* (2020.05); *G01S 5/0268* (2013.01)

(58) Field of Classification Search
CPC .. H04W 64/00; G01S 5/0218; G01S 5/02213; G01S 5/0268; G01S 5/12; G01S 5/0284; G01S 11/04; G01S 3/46
See application file for complete search history.

(56) References Cited

U.S. PATENT DOCUMENTS

| 10,061,011 | B2 * | 8/2018 | Steiner | G01S 5/0036 |
| 2004/0203872 | A1 * | 10/2004 | Bajikar | H04W 64/00 455/67.11 |
| 2018/0313931 | A1 * | 11/2018 | Dackefjord | G01S 5/10 |
| 2019/0182795 | A1 * | 6/2019 | Haartsen | H04W 8/005 |

FOREIGN PATENT DOCUMENTS

WO     2019113231     6/2019

* cited by examiner

*Primary Examiner* — Siu M Lee
(74) *Attorney, Agent, or Firm* — Gene Vinokur; Hironori Tsukamoto

(57) ABSTRACT

A Bluetooth-enabled device is provided, the Bluetooth-enabled device being configured to control a radio frequency (RF) chain during a first period to receive at a single antenna selected from a plurality of antennas, a constant tone extension (CTE) signal of multiple frames transmitted by the Bluetooth-enabled transmitter over multiple frequencies. Further the RF chain is controlled during a second period to switch among the plurality of antennas to receive the CTE signal at each of the plurality of antennas. An initial time-of-flight (ToF) data of the CTE signal is determined from first samples of the CTE signal received during the first period. Further, the Bluetooth-enabled transmitter is localized with respect to a location of the Bluetooth-enabled device using a signal model connecting samples of the CTE signal with an unknown angle-of-arrival of the CTE signal received at specific times, an unknown ToF conditioned on the initial ToF data.

12 Claims, 12 Drawing Sheets

BLUETOOTH-BASED SPATIAL-TEMPORAL LOCALIZATION

TECHNICAL FIELD

The present disclosure relates generally to the Bluetooth technology, and more specifically to an apparatus and a method for localizing a Bluetooth-enabled transmitter with respect to a Bluetooth-enabled device.

BACKGROUND

Bluetooth Low Energy (BLE) is a radiofrequency (RF) technology for wireless communication that can be leveraged to detect and track the location of people, devices, and assets for many indoor positioning use cases—including asset tracking, indoor navigation, proximity services and more. Bluetooth is an accessible and widespread technology prevalent throughout indoor spaces and supported by many of today's devices. Like other communication protocols including Wi-Fi and UWB, BLE can be used to transmit data between devices using radio waves.

Indoor positioning systems based on BLE technology rely on a BLE beacon mounted on objects, walls, ceilings, and other places from where BLE beacons emit radio signals at predetermined intervals. A Bluetooth-enabled device within the emission area of the BLE beacon can detect the radio signals and can establish communication with the BLE beacon. Although one beacon is sufficient in establishing the presence of Bluetooth-enabled device, it cannot pinpoint the specific location of the Bluetooth-enabled device. Thus, to pinpoint the location of the Bluetooth enabled device, techniques such as trilateration, that uses multiple BLE beacons are used. Further, the distance of the Bluetooth enabled device from the multiple BLE beacons is estimated at the Bluetooth enabled device based on Received Signal Strength Indicator (RSSI) of radio signals from the multiple BLE beacons, where the RSSI is a representation of the power of the radio signal from each BLE beacon in the multiple BLE-beacons. The RSSI value is low when the distance is long and higher when the distance is short. Further, to determine location of the Bluetooth-enabled device, angle of arrival (AoA) of the radio signals from the multiple BLE beacons is estimated.

However, in real world the radio signals are received through multiple paths (also referred to as "multipath") that degrades AoA estimation. Further, resolution or accuracy of AoA is a function of number of antennas used. As the number of antennas is usually limited due to size and computational constraints in indoor positioning via BLE techniques, the accuracy of the AoA estimation is affected in such cases. Moreover, the multiple beacons require coordination among them which introduces additional computational overhead on systems using BLE techniques for positioning applications.

Accordingly, there is a need of a device and a method for position measurement that is robust to multipath and increases accuracy of the AoA with limited number of antennas.

SUMMARY

It is an object of some embodiments to provide a device (also referred to as "Bluetooth-enabled device") and a method for determining exact location of a Bluetooth-enabled transmitter. The location of the Bluetooth-enabled transmitter can be determined based on distance of the Bluetooth-enabled transmitter from the Bluetooth-enabled device and orientation of the Bluetooth-enabled transmitter with respect to the Bluetooth-enabled device. The distance of the Bluetooth-enabled transmitter from the Bluetooth-enabled device can be determined based on a time-of-flight (ToF) of radio waves (for example, Bluetooth signal) from the Bluetooth-enabled transmitter to the Bluetooth-enabled device. To that end, multiple BLE beacons are used, where based on RSSI of each beacon, distance of the Bluetooth-enabled transmitter from the Bluetooth-enabled device is determined. However, to increase accuracy of the distance measurement, multiple BLE beacons are required and coordination between these multiple BLE beacons introduces computational overhead.

Further, the orientation or direction of the Bluetooth-enabled transmitter with respect to the Bluetooth-enabled device may be determined based on AoA of the radio signals at the Bluetooth-enabled device from the Bluetooth-enabled transmitter. However, AoA measurement may not be accurate due to multipath noise caused by the phase distortion and amplitude distortion generated when the radio waves are reflected from multiple surfaces while travelling to the Bluetooth-enabled device.

To overcome above-mentioned problems, a new Bluetooth direction finding feature that uses sampling of radio signal received at the Bluetooth-enabled device to measure a phase of the radio waves incident upon an antenna at a specific time is used. To determine the AoA at Bluetooth-enabled device comprising an array of antennas, the sampling process is applied to each antenna in the array of antenna, one at a time, and in some suitable sequence depending on the design of the array. The sampled data is then used to calculate the direction of the Bluetooth-enabled transmitter from the Bluetooth-enabled device.

To support sampling and the use of sampled data by higher layers in Bluetooth stack (also referred to as "stack"), a link layer (LL) in the stack is modified to include a Constant Tone Extension (CTE) field. The CTE field consists solely of digital ones since it means that the entire CTE is transmitted at one frequency and, therefore, has a constant wavelength. The CTE field is not subject to the whitening process.

Currently, in Bluetooth standards 5.1 and newer ones, the CTE signal is specifically defined for determining AoA of a radio signal. Some embodiments are based on the realization that the CTE signal may be used to determine ToF of the radio signal.

Some embodiments are based on the realization that the distance of the Bluetooth-enabled transmitter from the Bluetooth-enabled device can be determined based on the ToF that the radio signals (i.e., CTE signal) from the Bluetooth-enabled transmitter took to reach the Bluetooth-enabled device. The ToF may be calculated if time at which the Bluetooth-enabled transmitter transmitted the CTE signal and time at which the Bluetooth-enabled device received the CTE signal. However, often the time at which the Bluetooth-enabled transmitter transmitted the CTE signal is not known. Therefore, determining the ToF of the CTE signal is challenging.

Some embodiments are based on the realization that the Bluetooth-enabled transmitter may be localized based on the ToF and AoA of the CTE signal transmitted by the Bluetooth-enabled transmitter. For determining the ToF and AoA of the CTE signal to localize the Bluetooth-enabled transmitter, the present disclosure proposes a signal model, that examines samples of the CTE signal with an unknown AoA of the CTE signal received at specific time and transmitted with an unknown ToF conditioned on the initial ToF. As the signal model has two unknowns, namely, ToF and AoA of the CTE signal, solving the signal model to determine the two unknowns is challenging. Therefore, the signal model is solved in two stages, where in a first stage (or at first period), an initial estimate of the ToF is determined, and in a second stage the initial estimate of the ToF is used to initialize the signal model to and determine the AoA and ToF jointly.

The initial estimate of ToF is determined based on a phase of the CTE signal received at the Bluetooth-enabled device. The phase of the CTE signal is a function of a delay (time) and a channel frequency at which the CTE signal is transmitted. Further, the initial estimate of the ToF is used to jointly determine AoA of the CTE signal at the Bluetooth-enabled device from the Bluetooth-enabled transmitter. Further, in the first stage to determine the initial estimate of the ToF, the Bluetooth-enabled device is configured to control, during the first period, each RF chain to select a single antenna from multiple antennas comprised within a transceiver of the Bluetooth-enabled device. The Bluetooth-enabled device is configured to receive at the selected antenna, the CTE signal, where the CTE signal is comprised in multiple frames and is transmitted over multiple frequencies that are prescribed in a Bluetooth communication protocol.

Further, in the second stage, to determine the AoA based on the estimated ToF, the Bluetooth-enabled device is configured to control, during the second period, the RF chain to switch among the multiple antennas according to a switching schedule to receive the CTE signal at each antenna of the multiple antennas. To that end, samples of the CTE signal received during the second period are then fitted in the signal model determined earlier. The signal model is then initialized with the estimated ToF and is solved iteratively to calculate the AoA of the CTE signals.

In this way, by determining ToF that is indicative of distance of the Bluetooth-enabled transmitter from the Bluetooth-enabled device in a first stage during a first period; and then determining the AoA indicative of orientation of the Bluetooth-enabled transmitter with respect to the Bluetooth-enabled device in a second stage during a second period based on the ToF estimated in the first stage, the Bluetooth-enabled transmitter is accurately localized.

Accordingly, one embodiment discloses a Bluetooth-enabled device having a transceiver with multiple antennas for each RF chain, the device comprising: a processor; and a memory having instructions stored thereon that, when executed by the processor, cause the Bluetooth-enabled device to: control the RF chain during a first period to receive at a single antenna selected from multiple antennas, a CTE signal of multiple frames transmitted by a Bluetooth-enabled transmitter over multiple frequencies prescribed in a Bluetooth communication protocol; control the RF chain during a second period to switch among the multiple antennas according to a switching schedule to receive the CTE signal at each of the multiple antennas; recover, from first samples of the CTE signal received during the first period, an initial ToF of the CTE signal indicative of a distance between the Bluetooth-enabled device and the Bluetooth-enabled transmitter using phase of the CTE signal dependent on the ToF and the transmitted frequencies; and localize the Bluetooth-enabled transmitter with respect to a location of the Bluetooth-enabled device by fitting second samples of the CTE signal received during the second period into a signal model connecting the second samples with an unknown angle-of-arrival of the CTE signal received at times prescribed by the switching schedule and transmitted with an unknown ToF conditioned on the initial ToF.

Accordingly, another embodiment discloses a method comprising: controlling a RF chain corresponding to multiple antennas in a transceiver of a Bluetooth-enabled device during a first period to receive at a single antenna selected from the multiple antennas a CTE signal of multiple frames transmitted by a Bluetooth-enabled transmitter over multiple frequencies prescribed in a Bluetooth communication protocol; controlling the RF chain during a second period to switch among the multiple antennas according to a switching schedule to receive the CTE signal at each of the multiple antennas; recovering, from first samples of the CTE signal received during the first period, an initial ToF of the CTE signal indicative of a distance between the Bluetooth-enabled device and the Bluetooth-enabled transmitter using phase of the CTE signal dependent on the ToF and the transmitted frequencies; and localizing the Bluetooth-enabled transmitter with respect to a location of the Bluetooth-enabled device by fitting second samples of the CTE signal received during the second period into a signal model connecting the second samples with an unknown angle-of-arrival of the CTE signal received at times prescribed by the switching schedule and transmitted with an unknown ToF conditioned on the initial ToF.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
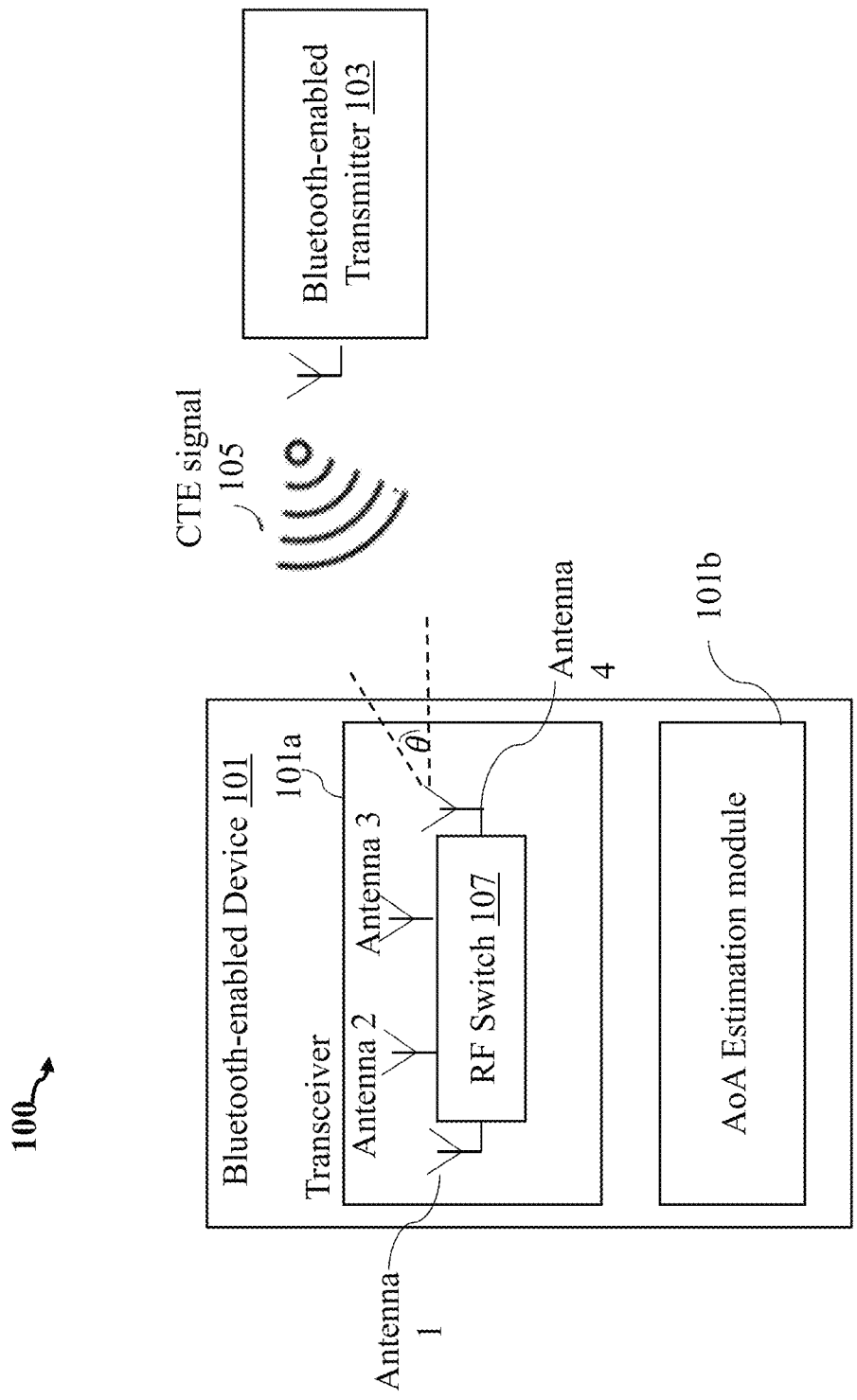
FIG. 1A illustrates an environment for a Bluetooth-enabled device localizing a Bluetooth-enabled transmitter, according to some embodiments.

FIG. 1A illustrates an environment 100 for a Bluetooth-enabled device 101 configured for localizing a Bluetooth-enabled transmitter 103, according to some embodiments. The Bluetooth-enabled device 101 is configured to receive radio signals including Bluetooth data packets (as shown in FIG. 1C) comprising a CTE signal 105 in a CTE frame from the Bluetooth-enabled transmitter 103. The Bluetooth-enabled transmitter 103 may correspond to any device that can transmit the CTE signal 105 over channel frequencies prescribed in the Bluetooth communication protocol. For example, the Bluetooth-enabled transmitter 103 may be a Bluetooth-enabled user device that is broadcasting its CTE signal to find its location.

The CTE signal 105 comprises a series of known symbols (all 1s) transmitted by the Bluetooth-enabled transmitter 103 with no whitening. A length associated with the CTE signal 105 is variable and is in the range of 16 μs to 160 μs. Thus, the CTE signal 105 is a single-tone signal at an associated carrier frequency.

When the Bluetooth-enabled device 101 receives the CTE signal 105 from to the Bluetooth-enabled transmitter 103, the Bluetooth-enabled device 101 determines ToF of the CTE signal 105 and an AoA of the CTE signal 105 to determine a location of the Bluetooth-enabled transmitter 103. The Bluetooth-enabled device 101 may communicate with the Bluetooth-enabled transmitter 103 to determine the location information of the Bluetooth-enabled transmitter 103.

The Bluetooth-enabled device 101 comprises a transceiver 101a comprising a plurality of antennas, such as an Antenna 1, an Antenna 2, an Antenna 3, and an Antenna 4. For the ease of describing, the transceiver 101a with only four antennas is illustrated. However, there can be more than four antennas in the transceiver 101a, without deviating from the scope of the present disclosure. The transceiver 101a comprises a RF switch 107 that is controlled to select an antenna from the plurality of antennas (Antenna 1 to Antenna 4) or to switch among the plurality of antennas. Further, the received CTE signal 105 is demodulated by the transceiver 101a and the demodulated CTE signal is provided to an AoA estimation module 101b, that uses the demodulated CTE signal 105 to localize the Bluetooth-enabled transmitter 103.

To that end, the AoA estimation module 101b initially estimates ToF data of the CTE signal 105 based on the phase of the received CTE signal 105, where the phase of the received CTE signal 105 is a function of delay (or time) and a channel frequency (also referred to as "transmit frequency") at which the CTE signal 105 is transmitted. The CTE signal ($x_t$(t)) 105 is mathematically represented as:

$$x_t(t)=e^{j2\pi(f_c+kB_c+f_{CTE})t}, k=1,2,\ldots,40 \quad (1)$$

where $f_c$ represents an associated carrier frequency which may be 2400 MHz in an example, $B_c$ is a channel bandwidth which may be 2 MHz, $f_{CTE}$ is CTE frequency which may be 250 KHz, and k represents BLE channel index used to transmit the Bluetooth packet comprising the CTE signal 105.

Figure 1B:
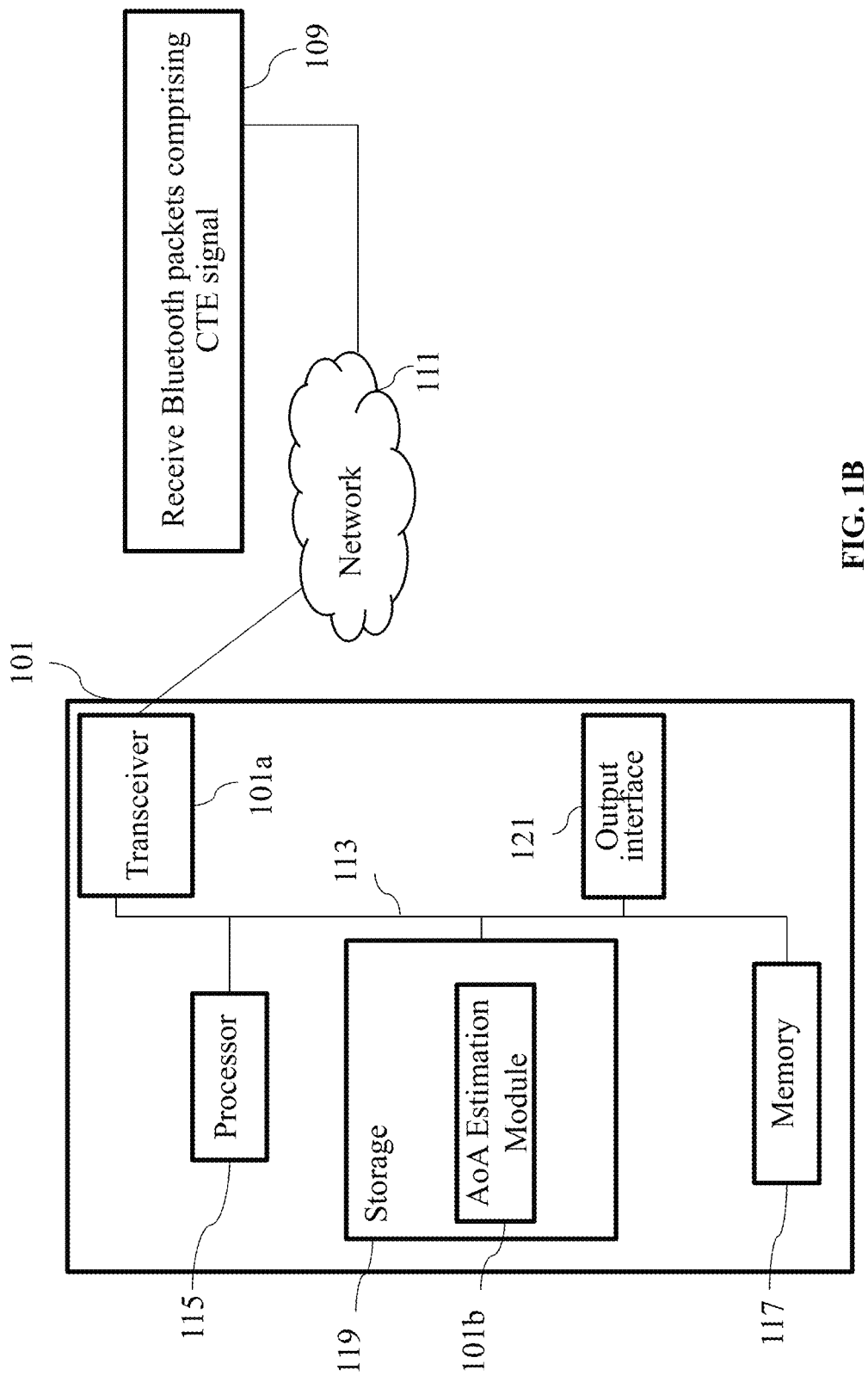
FIG. 1B illustrates a block diagram of the Bluetooth-enabled device, according to some embodiments.
Figure 1C:
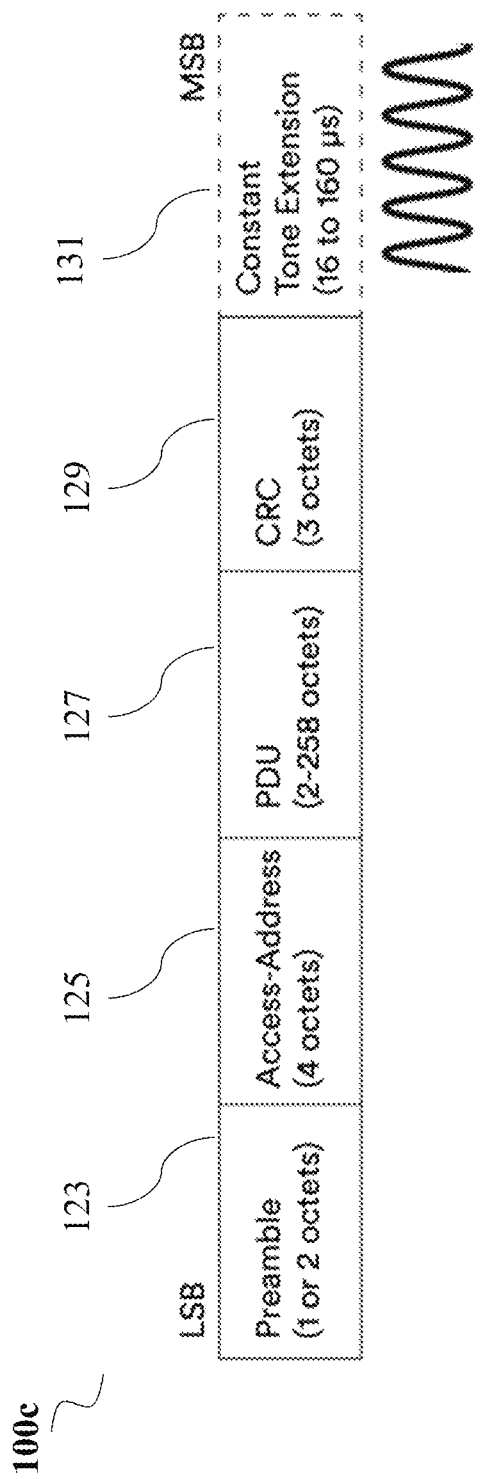
FIG. 1C illustrates a Bluetooth Link Layer (LL) data frame with a CTE frame that comprises the CTE signal, according to some embodiments
Figure 2:
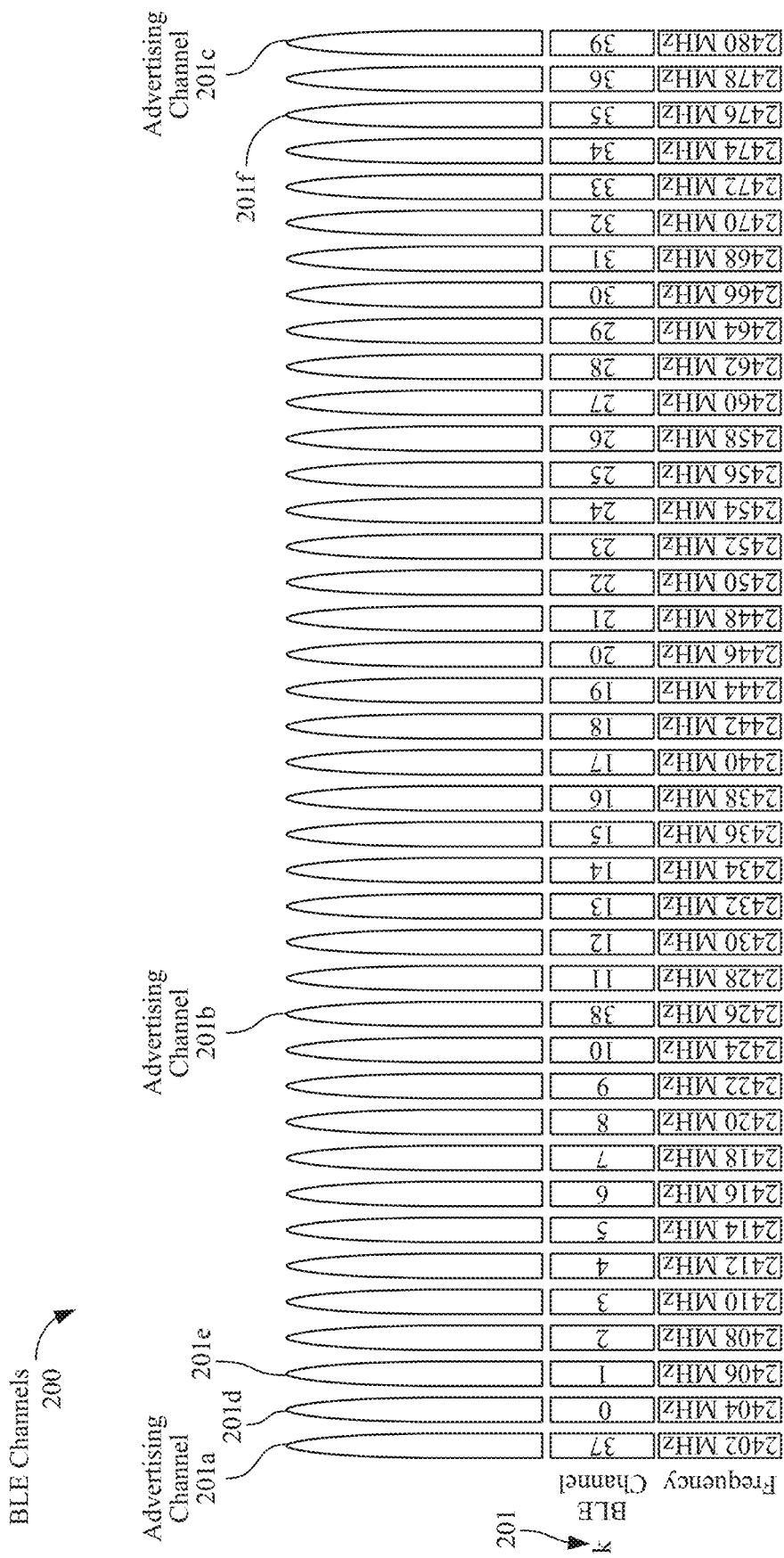
FIG. 2 illustrates BLE channels used for transmitting the Bluetooth packet, according to some embodiments.

FIG. 1B illustrates a block diagram of the Bluetooth-enabled device 101, according to some embodiments. The Bluetooth-enabled device 101 comprises the transceiver 101a configured to receive 109 Bluetooth packets comprising the CTE signal 105 via a wireless Bluetooth network 111. The CTE signal 105 may be transmitted over multiple channel frequencies included in BLE channels (as shown in FIG. 2) as per the Bluetooth communication protocol. The transceiver 101a comprises an antenna array with a plurality of antennas (as shown in FIG. 1A) of which one of the antennas is selected to receive the CTE signal 105. The antenna may be selected randomly from the plurality of antennas. In some embodiments, the antenna to be selected to receive the CTE signal 105 is predetermined. On receiving the CTE signal 105, it is demodulated and the demodulated CTE signal 105 is provided to the AoA estimation module 101b.

Further, the Bluetooth-enabled device 101 includes at least one processor 115 configured to execute stored instructions, as well as a memory 117 that stores the instructions that are executable by the at least one processor 115 (referred to as processor 115 hereinafter). The processor 115 can be a single core processor, a multi-core processor, a computing cluster, or any number of other configurations. The memory 117 can include random access memory (RAM), read only memory (ROM), flash memory, or any other suitable memory systems. The processor 115 is connected through a bus 113 to one or more input and output devices of the Bluetooth-enabled device 101. Further, the Bluetooth-enabled device 101 includes a storage device 119 adapted to store executable instructions for the processor 115. The storage device 119 can be implemented using a hard drive, an optical drive, a thumb drive, an array of drives, or any combinations thereof.

The storage device 119 is configured to store the AoA estimation module 101b which receives the demodulated CTE signal 105 and uses a signal model to jointly determine ToF and AoA. The estimated ToF is used to calculate AoA (θ) using the signal model that determines ToF and AoA jointly. The signal model is initialized with the estimated value of the ToF of the CTE signal 105, where the initialization with rough estimate of the ToF refines ToF calculation using the signal model. Further, search space for determining ToF and AoA is also reduced. Steps for estimating the ToF of the CTE signal 105 and calculating the AoA at the AoA estimation module 101b are described later with reference to FIG. 3.

Additionally, the Bluetooth-enabled device 101 may include an output interface 121. In some embodiments, the output interface 121 may be configured to provide location of the Bluetooth-enabled transmitter 103 determined by the AoA estimation module 101b.

FIG. 1C illustrates a Bluetooth Link Layer (LL) data frame 100c with a CTE frame that comprises the CTE signal 105, according to some embodiments. The Bluetooth LL data frame 100c (also referred to as "data packet") is transmitted in the radio signal by the Bluetooth-enabled transmitter 103. The Bluetooth-enabled transmitter 103 may transmit a plurality of the Bluetooth LL data frame in the radio signal. The LL data frame 100*c* includes a preamble field 123 comprising a preamble, an access address field 125 comprising an access address, packed data unit (PDU) field 127 comprising a PDU, a cyclic redundancy check (CRC) field 129 comprising the CRC, and a CTE field 131 (also referred to as "CTE frame") comprising the CTE signal 105. Each filed comprises a sequence of bits (1 or 0), where the preamble field 123 comprises the least significant bits (LSB) and the CTE field 131 comprises the most significant bits (MSB). The preamble, in the preamble field 123, is used in the Bluetooth enabled device 101 to perform frequency synchronization, automatic gain control (AGC) training, and symbol timing estimation. The preamble is a fixed sequence of alternating 0 and 1 bits. The access address, in the access address field 125, is a 4-octet value. Each LL connection between any two devices (for example, Bluetooth devices 101 and 103) has a distinct access address. Each time the Bluetooth enabled device 101 needs a new access address.

When a Bluetooth Low Energy (BLE) packet is transmitted on either a primary or a secondary advertising physical channel or a periodic physical channel, the PDU is defined as an Advertising Physical Channel PDU. When a BLE packet is transmitted on a data physical channel, a PDU is defined as a Data Physical Channel PDU.

Further, the size of the CRC is 3 octets and is calculated on the PDU of all LL packets. If the PDU is encrypted, then the CRC is calculated after encryption of the PDU is complete.

Finally, the LL data frame 100*c* comprises the CTE that consists of a constantly modulated series of unwhitened 1s. The CTE field 131 has a variable length that ranges from 16 μs to 160 μs. The CTE signal 105 is used by the Bluetooth enabled transmitter 103 is configured to transmit the CTE signal 105, in the Bluetooth LL data frame 100*c*, to the Bluetooth-enabled device 101, where the CTE signal 105 transmitted by the Bluetooth enabled transmitter 103 is used by the Bluetooth-enabled device 101 to pinpoint the exact location of the Bluetooth enabled transmitter 103 with respect to the Bluetooth-enabled device 101.

To determine the location of the Bluetooth enabled transmitter 103, the Bluetooth-enabled device 101 is configured to utilize the CTE signal 105 in multiple stages (stage 1 and stage 2). At stage 1, an approximate ToF of the CTE signal 105 transmitted by the Bluetooth enabled transmitter 103 is determined using frequency hopping at a fixed antenna (no antenna switching). To that end, the Bluetooth-enabled device 101 is configured to select one antenna of the plurality of antennas (Antenna 1 . . . Antenna 4) to receive multiple CTE frames comprising the CTE signal 105 over multiple channels of the Bluetooth communication protocol. Different frequencies of the Bluetooth communication protocol used for frequency hopping is illustrated in FIG. 2.

At stage 2, the AoA and ToF of the CTE signal 105 are jointly determined using frequency hopping and antenna switching. To that end, the Bluetooth-enabled device 101 is configured to switch antennas after a predetermined interval within each CTE frame of multiple CTE frames transmitted over multiple frequency channels (for example, a first CTE frame transmitted over a first channel (k=1) and a second CTE frame transmitted over a second channel (k=2)). Thus, the CTE signal 105 in the single CTE frame is sampled using antenna switching between multiple antennas, where a sampling time is equal to an amount of time each antenna of the multiple antennas received the CTE signal 105. The amount of time for which each antenna should be connected to the RF chain, to receive the CTE signal 105, is predetermined. The sampling may continue till the end of each CTE frame of the multiple CTE frames.

FIG. 2 illustrates BLE channels 200 used for transmitting a Bluetooth packet, according to some embodiments. The Bluetooth packet, for example a LL Bluetooth packet is as illustrated in FIG. 1C, where the Bluetooth packet comprises the PDU, the access address, the preamble, and the CTE signal 105 that is used for localizing the Bluetooth-enabled transmitter 103. According to the Bluetooth communication protocol, there are 40 BLE channels (k) 201 from 0 to 39 over which Bluetooth packets are transmitted. However, in the equation (1) range of k 201 is kept from 1 to 40 for ease of mathematical operations, where k=1 corresponds to channel 0 of the BLE channels 200. Each channel of the 40 BLE channels 200 has different frequencies ranging from 2402 MHz to 2480 MHz with a bandwidth of 2 MHz. The BLE channels 200 are used to transmit the CTE signal 105 using frequency hopping over 40 channels. Optionally, the BLE channels 200 comprise three advertising channels. The Bluetooth-enabled transmitter 103 advertises on the three advertising channels. The advertising channels are channel 37 (2402 MHz) 201*a*, channel 38 (2426 MHz) 201*b*, and channel 39 (2480 MHz) 201*c*. These channels are selected to minimize interference from Wi-Fi channels.

These three channels 201*a* (k=37), 201*b* (k=38), and 201*c* (k=39) are called the Primary Advertising Channels, while the remaining 37 channels, for example, channel 201*d* (k=1), channel 201*e* (k=2), channel 201*f* (k=35), and the like are called the Secondary Advertisement Channels. Secondary advertising channels are used as "auxiliary" channels meaning that a device (for example, the Bluetooth-enabled transmitter 103) has to first advertise on the primary advertising channels before sending out advertising packets on the secondary channels. If the Bluetooth-enabled transmitter 103 wants to utilize the secondary advertising channels, it sends out advertising packets on the primary channels that point to the secondary advertising packets.

Data extracted from one or more channels of the Bluetooth packets is used to determine the ToF and AoA information associated with localization of the Bluetooth-enabled transmitter 103.

Figure 3A:
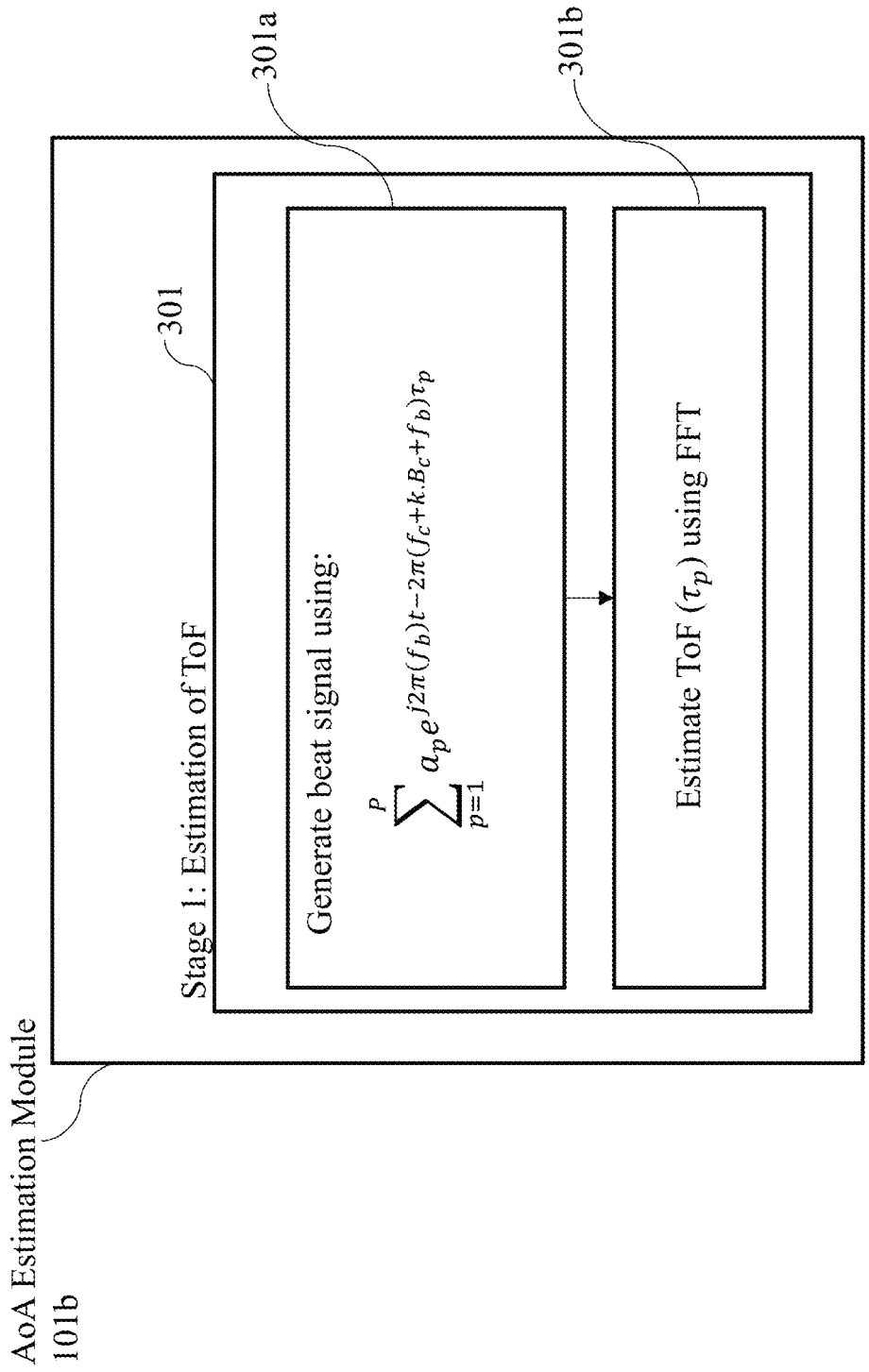
FIG. 3A illustrates steps performed by an ToF estimation module, in a first stage, for localizing the Bluetooth-enabled transmitter, according to some embodiments.

FIG. 3A illustrates steps performed by the AoA estimation module 101*b*, in a first stage 301, for localizing the Bluetooth-enabled transmitter 103, according to some embodiments. The AoA estimation module 101*b* localizes the Bluetooth-enabled transmitter 103 in two stages, where at the first stage (stage 1) 301 ToF data of the CTE signal 105 is estimated and at the second stage (stage 2) 303 (FIG. 3B) the signal model is used to determine AoA of the CTE signal 105, using the ToF estimated in the first stage 301.

To estimate the ToF, at the first stage 301, the Bluetooth-enabled device 101 is configured to control an RF chain, during a first period to select a single antenna of the multiple of antennas (Antenna 1 . . . Antenna 4) of the transceiver 101*a* to receive the CTE signal 105 over multiple CTE frames, transmitted by the Bluetooth-enabled transmitter 103, over multiple channel frequencies (also referred to as "transmitted frequencies") (as shown in FIG. 4) corresponding to channels k prescribed in the Bluetooth communication protocol (as shown in FIG. 2). The RF chain is a cascade of the multiple antennas with electronic components and sub-units such as amplifiers, filters, mixers, attenuators, and detectors. The first period may refer to a period or duration of time designated for controlling the RF chain for receiving the CTE signal 105 over multiple frequencies by the selected antenna. In some embodiments, duration of the first period continues till the Bluetooth-enabled device 101 determines the initial estimate of ToF of the received CTE signal 105.

The received CTE signal 105 during the first period is sampled generating first samples of the CTE signal 105. The first samples of the CTE signal 105 are then used to recover an initial ToF data of the CTE signal 105 using the phase of the received CTE signal 105, depending on the ToF of the CTE signal 105 and the transmitted frequencies of the CTE signal 105.

To that end, the received first samples of the CTE signal 105 are demodulated and a virtual array of antennas is generated based on the demodulated first samples of the CTE signal 105 to recover the initial ToF data for each path of the multiple paths over each transmitted frequency of the multiple transmitted frequencies.

Further, at step 301a, on receiving the first samples of the CTE signal 105, a beat signal ($x_b(t)$) for each channel k is generated by accumulating CTE signal 105 received via multiple paths p and over multiple channel frequencies k that forms the virtual array:

$$x_b(t) = \Sigma_{p=1}^{P} a_p e^{j2\pi(f_b)t - 2\pi(f_c + k \cdot B_c + f_b)\tau_p} \quad (2)$$

where p represents the p-th path of an overall P multi-paths, $f_b$ represents the CTE frequency, which is 250 KHz, $f_c$ represents carrier frequency which is 2400 MHz, $B_c$ is a channel bandwidth which is 2 MHz, $\tau_p$ represents ToF of the CTE signal 105 via a specific path p, and $a_p$ represents amplitude of the of the CTE signal 105 via a specific path p. Further, $j2\pi(f_b)t$ indicates baseband CTE frequency and $2\pi(f_c + k \cdot B_c + f_b)\tau_p$ indicates phase at the CTE frequency that is a function of ToF ($\tau_p$) and channel index k.

Finally, at step 301b, the initial estimate of the ToF ($\tau_p$) data of the CTE signal 105 for each path of the multiple paths is determined by taking fast Fourier transform (or, equivalently, spectrum estimation methods) of the beat signal (FFT{$x_b$ (t)}) over the channel index k. The peak frequency is $2\pi B_c \tau_p$. For the Bluetooth standards, $B_c$ is the BLE channel bandwidth and $B_c$=2 MHz. From the detected peak frequency, the ToF $\tau_p$ can be estimated. From the transformed beat signal, the phase of the CTE signal 105 travelled through each path of the multiple paths is obtained. Based on the obtained phase of the CTE signal 105 initial estimate of ToF data of the CTE signal 105 for each path of the multiple paths is estimated using FFT of the beat signal. The transformed beat signal is further demodulated to obtain identification information associated with the Bluetooth-enabled transmitter 103 transmitting the CTE signal 105.

Figure 3B:
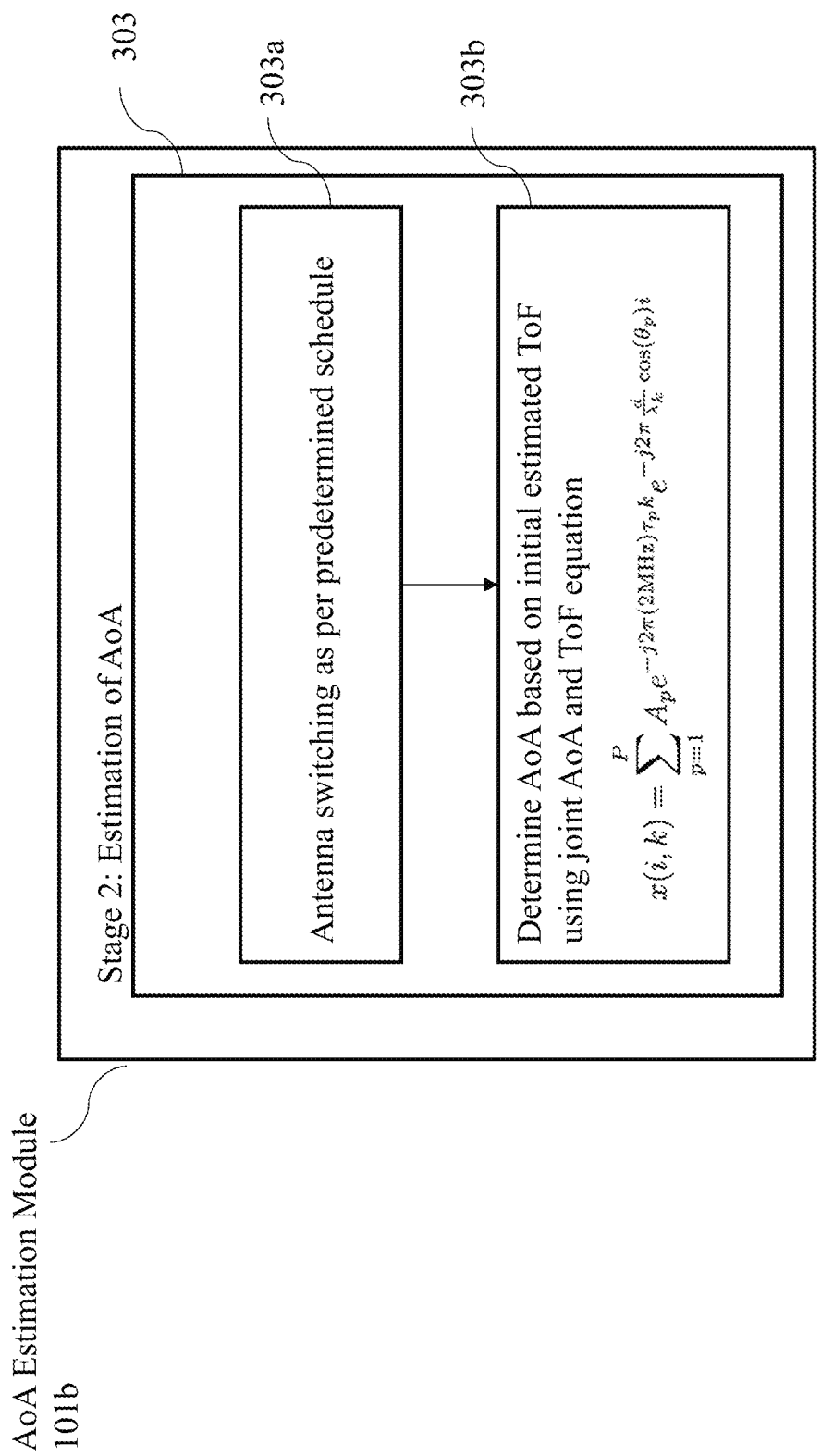
FIG. 3B illustrates steps performed by the AoA estimation module, in the second stage, for localizing the Bluetooth-enabled transmitter, according to some embodiments.

FIG. 3B illustrates steps performed by the AoA estimation module 101b, in the second stage 303, for localizing the Bluetooth-enabled transmitter 103, according to some embodiments. At second stage 303, the AoA and ToF of the CTE signal 105 is calculated jointly during a second period. In some embodiments, the second period is predefined. In other embodiments, duration of the second period continues till the Bluetooth-enabled device 101 determines the final AoA and ToF of the CTE signal 105 to determine the exact location of the Bluetooth-enabled transmitter 103.

To calculate the AoA of the CTE signal 105, at step 303a, the Bluetooth-enabled device 101 is further configured to control the RF chain, during the second period, to switch among the plurality of antennas for multiple Bluetooth packets over multiple channels according to a switching schedule to receive second samples of the CTE signal 105 at each antenna of the plurality of antennas. The switching schedule to switch among antennas is predetermined. The second period may refer to a period or duration of time designated for switching between the plurality of antennas according to the switching schedule.

At step 303b, in stage 2, the AoA of the CTE signal 105 is determined using the signal model given as:

$$x(i, k) = \sum_{p=1}^{P} A_p e^{-j2\pi(B_c)\tau_p k} e^{-j2\pi \frac{d}{\lambda_k} \cos(\theta_p) i} \quad (3)$$

where i represents antenna index during the antenna switching, $\lambda_k$ represents wavelength at channel k such $$\text{as} = \frac{c}{2400 \text{ MHz} + k \cdot 2 \text{ MHz}},$$

and c is speed of light.

The signal model is initialized with the initial estimate of the ToF data determined in stage 1 301. Further, the signal model is used to localize the Bluetooth-enabled transmitter 103 with respect to a location of the Bluetooth-enabled device 101 by fitting the second samples of the CTE signal 105 received during the second period into the signal model, where the signal model connects the second samples with an unknown AoA of the CTE signal 105 received at times prescribed by the switching schedule and transmitted with an unknown ToF conditioned on the initial ToF.

The signal model is used to jointly estimate both the ToF and AoA of the CTE signal 105, where the initial estimate of the ToF determined in stage 1 301 is used to initialize the signal model. Initializing the signal model refines the ToF and further reduces the search space to determine accurate ToF and the AoA.

In some embodiments, the initial estimate of the ToF from the first stage 301 is used as a regularizer to penalize (for example, softly) deviation of ToF calculated in the second stage 303.

Figure 4A:
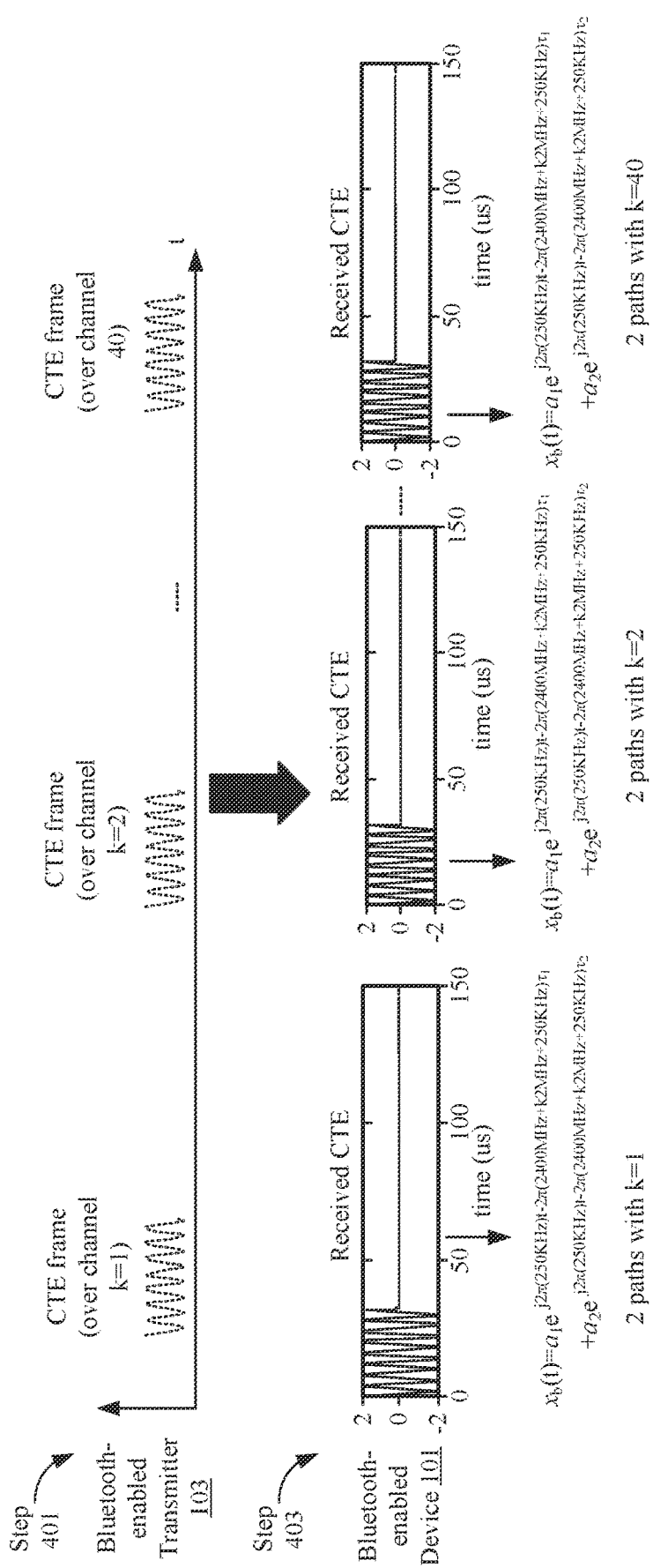
FIGS. 4A and 4B illustrate steps of enabling multiple CTE frames over multiple channels at a fixed antenna and estimating the ToF of multiple paths, according to some embodiments.
Figure 4B:
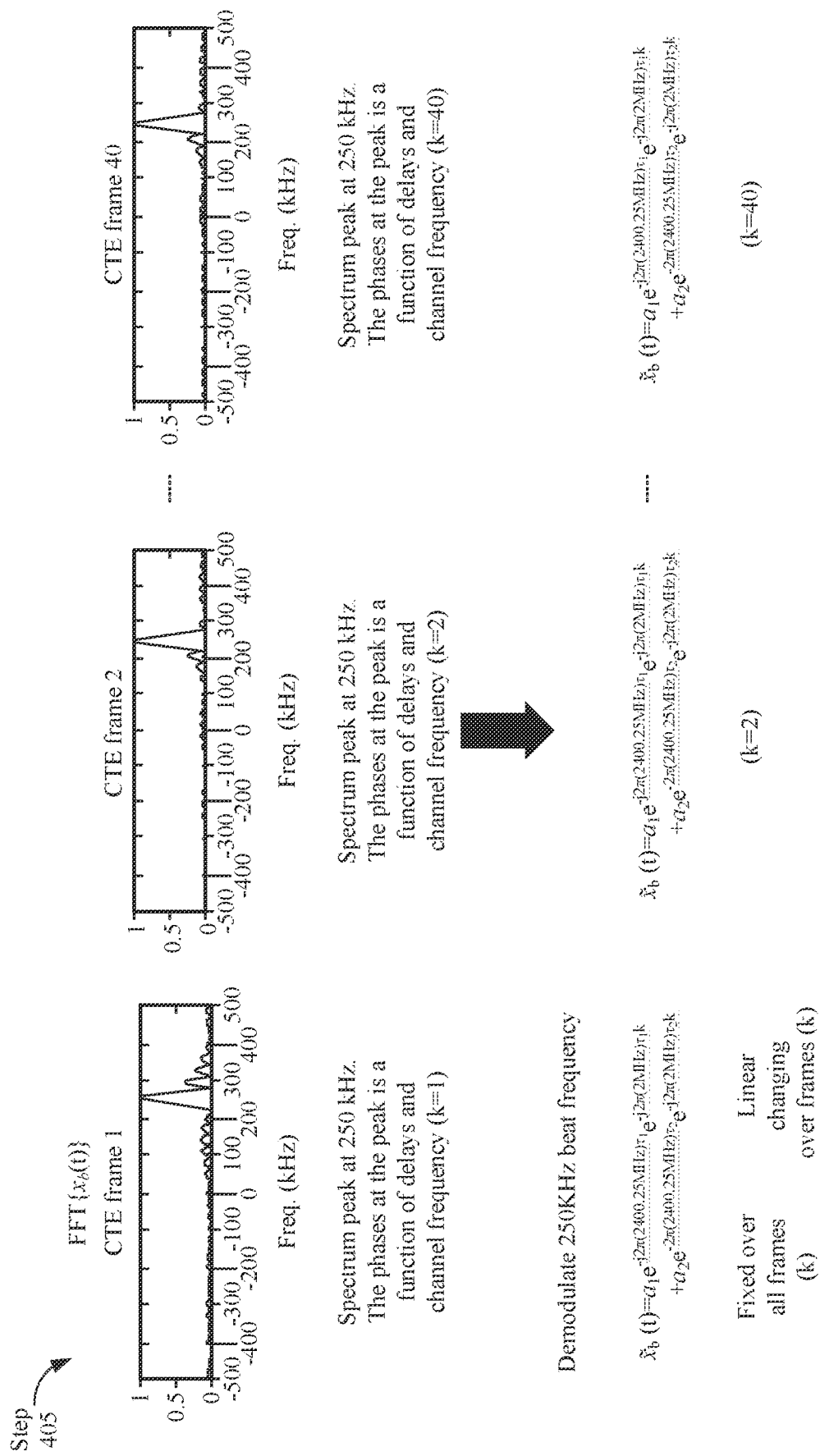

FIGS. 4A and 4B illustrate steps of generating an equivalent virtual array for the ToF estimation, according to some embodiments. FIG. 4 is described below in conjunction with FIG. 2 and FIG. 3A. In FIG. 4, at step 401, the CTE signal 105 of multiple CTE frames over multiple Bluetooth channels (k=1, 2, . . . , 40) is transmitted by the Bluetooth-enabled transmitter 103. At step 403, the Bluetooth-enabled device 101 is configured to select one antenna of the plurality of antennas, during first period, to receive first samples of the CTE signal 105 through multiple paths P. For the ease of describing, assuming two paths (p) via which the selected antenna receives the first samples of the CTE signal 105. Based on the first samples of the CTE signal 105, beat signal $x_b$ (t) (equation 2) is generated for each channel k of the multiple channels k. For example, a beat signal generated corresponding to channel 1 using which the selected antenna received the CTE signal 105 through 2 paths (p=1, 2) is given as:

$$x_b(t) = \Sigma_{p=1}^{2} a_p e^{j2\pi(250 \text{ KHz})t - 2\pi(2400 \text{ MHz} + k \cdot 2 \text{ MHz} + 250 \text{ KHz})\tau_p}.$$

By receiving the CTE signal 105 over multiple paths, a virtual array of antennas is generated. For example, if the CTE signal 105 is received, by using the only one selected antenna, via two paths (p=2) for each channel frequency (k=0 to 39) then the virtual array of antenna comprising 40 virtual antennas receiving the CTE signal is generated which is now able to distinguish two paths in the ToF (delay) domain.

Further, at step 405, initial estimate of the ToF is determined using FFT of the beat signal $x_b$ (t) for each CTE frame of the multiple CTE frames received over the multiple channels k. On taking the FFT, the beat signal is transformed from the time domain to frequency domain, where in the frequency domain a spectrum peak of the CTE signal 105 over each channel frequency k is observed at 250 kHz. The phase at the peak is a function of delay and the corresponding channel k.

At step 407, the beat signal $x_b$ (t) over channel k is demodulated to obtain demodulated beat signal $\tilde{x}_b$ (t) that is given by:

$$\tilde{x}_b(t) = \sum_{p=1}^{P} a_p e^{-j2\pi(f_b+f_c)\tau_p} e^{-j2\pi k \cdot B_c \tau_p} \quad (4)$$

where term "$-j2\pi(f_b+f_c)$" is fixed over all the channels k and the term "$-j2\pi k \cdot B_c \tau_p$" linearly changes over channel index k. For example, demodulated beat signal corresponding to channel 1 may be given as:

$$\tilde{x}_b(t) =$$
$$a_1 e^{-j2\pi(2400.25\ MHz)\tau_1} e^{-j2\pi 1 *(2\ MHZ)\tau_1} + a_2 e^{-j2\pi(2400.25\ MHz)\tau_2} e^{-j2\pi 1 *(2\ MHZ)\tau_2}$$

The CTE signal 105 includes a plurality of samples, such as first samples and second samples of the CTE signal 105 received during first time period and second time period respectively, as will be illustrated in FIGS. 5A and 5B described below.

Figure 5A:
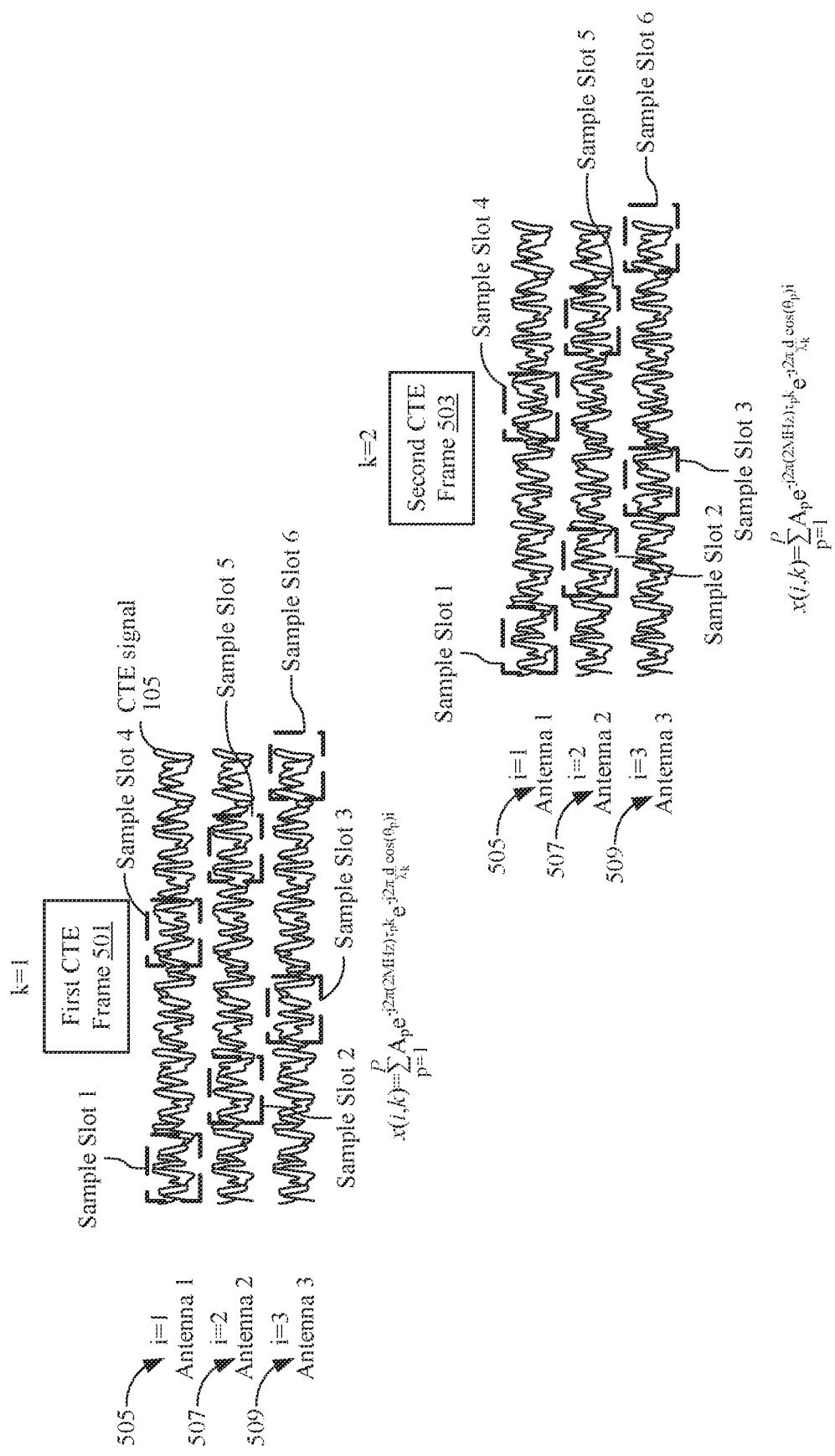
FIG. 5A illustrates steps of enabling multiple CTE frames over multiple channels over multiple antennas with antenna switching and estimating AoA of multiple paths while refining the ToF from the first stage, according to some embodiments.

FIG. 5A illustrates generation of second samples of the CTE signal 105, according to some embodiments. In FIG. 5A, the CTE signal 105 comprised in two CTE frames (a first CTE frame 501 and a second CTE frame 503) is received over two frequency channels k=1 (201*d*) and k=2 (201*e*) during the second period is illustrated. Assume that the Bluetooth-enabled device 101 configured to receive the CTE signal 105 of multiple CTE frames 501 and 503 comprises three antennas i.e., antenna 1 (i=1) 505, antenna 2 (i=2) 507, and antenna 3 (i=3) 507.

During the second period, for a length of each CTE frame (for example, the first CTE frame 501), second samples of the CTE signal 105 are generated by sampling the CTE signal 105 using antenna switching between a plurality of antennas (antenna 1 505, antenna 2 507, and antenna 3 509) such that each antenna of the plurality of antennas in the transceiver receives the CTE signal 105 for a predetermined amount of time. To that end, during the second period the Bluetooth-enabled device 101 is configured to perform antenna switching, where antennas are switched periodically among the plurality of antennas based on a switching schedule, and where the switching schedule is predetermined.

According to the switching schedule, only one antenna of the plurality of antennas (antenna 1 505, antenna 2 507, and antenna 3 509) in the transceiver 101*a* is selected to receive the CTE signal 105 for a specific time so that only one RF chain is used. For example, the antenna 1 505 may be selected, initially, to receive the CTE signal 105 for a first specific time period (sample slot 1) generating a first part of second samples of the CTE signal 105. On completion of the first specific time period, reception of the CTE signal 105 is switched from the antenna 1 505 to the antenna 2 507 for a second specific time period (sample slot 2) generating a second part of the second samples of the CTE signal 105. Similarly, on completion of the second specific time period, reception of the CTE signal 105 is switched from the antenna 2 507 to the antenna 3 509 for a third specific time period (sample slot 3) generating a third part of the second samples of the CTE signal 105. The switching of antennas among the plurality of antennas according to the switching schedule continues till the entire first frame of the CTE signal 105 is sampled to generate the second samples of the CTE signal 105. Thus, as the CTE signal 105 still remains to be sampled, on completion of the third specific time period, the reception of the CTE signal 105 is again switched from the antenna 3 509 to antenna 1 505 for a fourth specific time period (sample slot 4), generating a fourth part of the second samples of the CTE signal 105. Similarly, the fifth part in sample slot 5 and sixth part in sample slot 6 are generated by the antenna 2 507 and the antenna 3 509, respectively.

The process of generating the second samples continues for the second CTE frame 503 received over different frequency channel k=2 (201*e*) during the second period of time. The second CTE frame 503 is sampled using antenna switching, where antennas (antenna 1-antenna 3) are switched periodically among the plurality of antennas based on the predetermined antenna switching schedule.

Figure 5B:
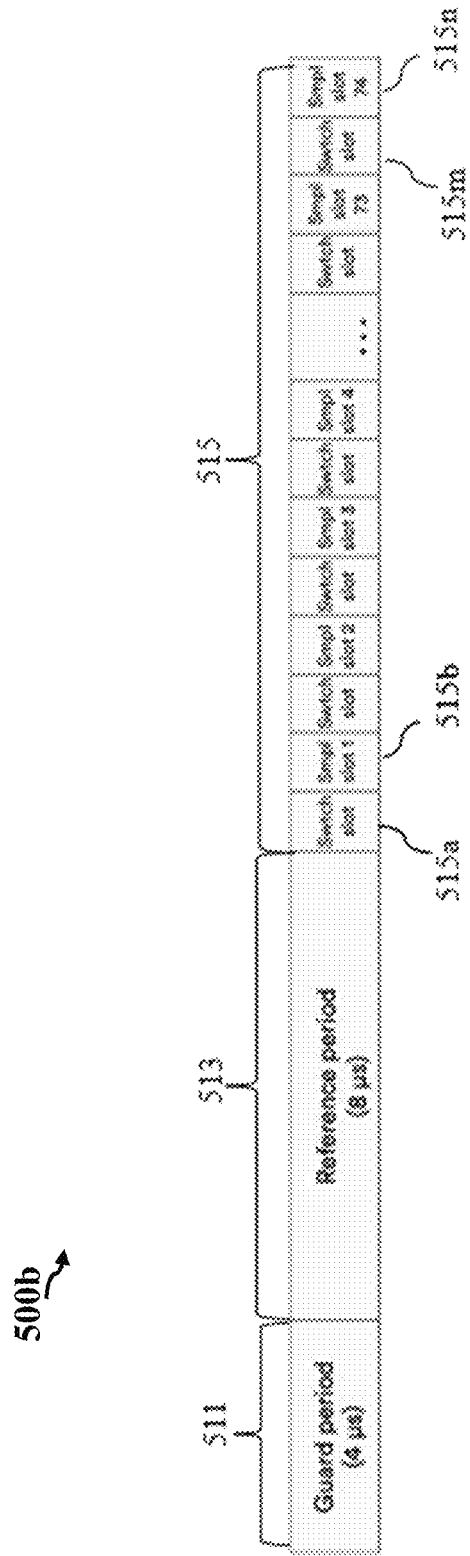
FIG. 5B illustrates a CTE structure comprising the predefined switching and sampling slots over one CTE frame transmitted over a given channel to generate the second samples of the CTE signal, according to some embodiments.

FIG. 5B illustrates a CTE structure 500*b* comprising the predefined switching and sampling slots 515 over one CTE frame transmitted over channel 201*d* (k=1) to generate the second samples of the CTE signal 105, according to some embodiments. FIG. 5B is described below in conjunction with FIG. 5A. The CTE structure 500*b* comprises a guard period 511 of 4 µs, a reference period 513 of 8 µs, and the switching and sampling slots 515. A receiver of the Bluetooth-enabled device 101 is configured to do the antenna switching to determine the direction to the Bluetooth-enable transmitter 103. This is enabled by adding CTE in the LL Bluetooth data frame (also referred to as "data packet") 100*c* (as shown in FIG. 1C), transmitted by the Bluetooth-enable transmitter 103, where the added CTE causes a specified part of the data packet to have a fixed and constant frequency. The receiver of the Bluetooth-enabled device 101 can sample In-phase and Quadrature (IQ) components of the CTE signal 105 transmitted by the Bluetooth-enabled transmitter 103 and determine the phase of the CTE signal 105 in each frame of multiple CTE frames (501*a* and 503) received by the Bluetooth-enabled device 101. By sampling IQ components of the CTE signal 105, in each CTE frame, for multiple antennas (antenna 1 505-antenna 3 509), the receiver of the Bluetooth-enabled device 101 can calculate from which angle the transmitted CTE signal 105 is received. To that end, the Bluetooth-enabled device 101 is configured to perform antenna switching, where antennas are switched among the plurality of antennas (antenna 1 505-antenna 3 509), and during the sampling slot (sample slot 1-sample slot 6) the CTE signal 105 is sampled by the antenna selected for the switch slot.

For example, the switching and sampling slots 515 comprises a plurality of predefined switch slot 515*a* to switch slot 515*m*, where during a time period of the switch slot the reception of the CTE signal 105 is switched from one antenna to another antenna, and during each sample slot of a plurality of sample slots (sample slot 515*b* to sample slot 515*n*) an antenna, selected during the previous switch slot, is configured to receive the CTE signal 105. The sample slot 515*b* may corresponds to sample slot 1 illustrated in FIG. 5A. In an example embodiment, the Bluetooth-enabled device 101 may be configured to switch from antenna 1 505 to antenna 2 507 during the switch slot 515*a*. Further, during (or for a length of) the sample slot 515*b* antenna 2 507 will be configured to receive the CTE signal 105. In this way, the antenna switching schedule is predefined. A number of the plurality of switch slots (515*a*-515*m*) and a number of the plurality of sample slots (515*b*-515*n*) may be based on a length of the CTE signal 105 of multiple CTE frames. In an example embodiment, the number of the plurality of switch slots (515*a*-515*m*) may be 74. Similarly, the number of the plurality of sample slots (515*b*-515*n*) may be 74. The antenna switching schedule is fully supported by BLE 5.1 & above standards.

Figure 6:
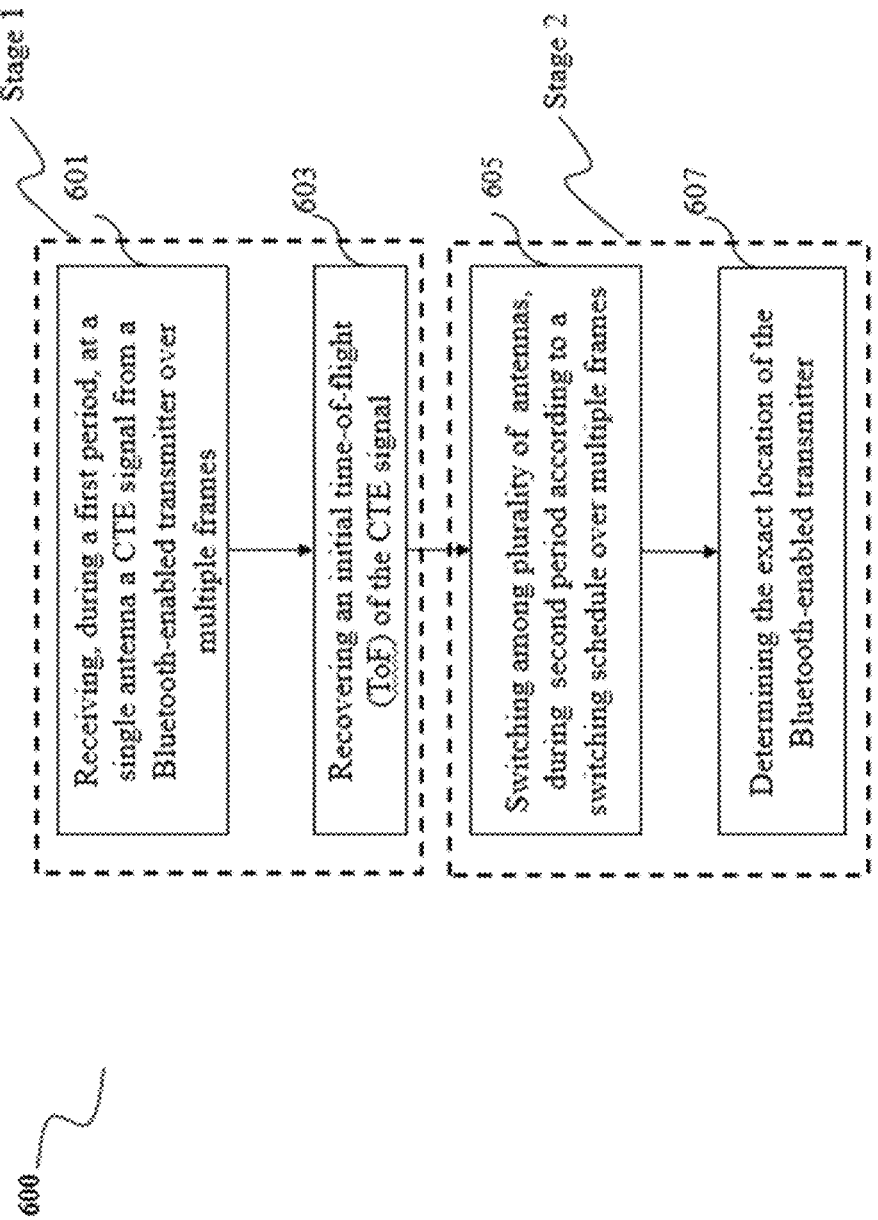
FIG. 6 illustrates flowchart of a method executed by the Bluetooth-enabled device for localizing the Bluetooth-enabled transmitter, according to some embodiments.

FIG. 6 illustrates flowchart of a method 600 comprising steps executed by the Bluetooth-enabled device 101 for localizing the Bluetooth-enabled transmitter 103, according to some embodiments. The method 600 is executed in two stages stage 1 and stage 2.

At step 601, an RF chain corresponding to a plurality of antennas in the transceiver 101*a* of the Bluetooth-enabled device 101 is controlled during a first period to select a single antenna from the plurality of antennas to receive first samples of the CTE signal 105. The first samples of CTE signal 105 may correspond to the CTE signal 105 received via a plurality of CTE in the LL Bluetooth packets transmitted by the Bluetooth-enabled transmitter 103 during the first period, where the plurality of CTE frames each comprising the CTE signal 105 is transmitted over a plurality of transmission frequencies comprised in the Bluetooth communication protocol. To that end, the RF switch 107 is used to select the single antenna from the plurality of antennas. In some embodiments, the single antenna to be used to receive the first samples of the CTE signal 105 is predetermined. The first samples of the CTE signal 105 may be stored in the memory 117 to be used later for estimating an initial estimate of ToF data of the CTE signal 105.

At step 603, the first samples of the CTE signal 105 are used to determine the initial estimate of the ToF of the CTE signal 105. The ToF is indicative of a distance between the Bluetooth-enabled device 101 and the Bluetooth-enabled transmitter 103. To determine the initial estimate of the ToF, initially a beat signal ($x_b$ (t)) for each channel k is generated by accumulating CTE signal 105 received via multiple paths p and over multiple channel frequencies k to form a virtual array of antennas. Then, an FFT of the beat signal for each channel k is calculated to determine the initial estimate of the ToF data of the CTE signal 105.

At step 605, the CTE signal 105 in each CTE frame of a plurality of CTE frames received during a second period is sampled using antenna switching to generate second samples of the CTE signal 105, where the plurality of CTE frames are transmitted over the plurality of transmission frequencies comprised int eh Bluetooth communication protocol. To that end, the RF chain is controlled using the RF switch 107 during the second period to switch among the plurality of antennas according to a switching schedule to receive second samples of the CTE signal 105. As per the switching schedule, only one antenna of the plurality of antennas is selected to receive the CTE signal 105 for a specific time period or a slot corresponding to the antenna. In some embodiments, the switching schedule may be predetermined. In other embodiments, the antennas may be selected randomly.

At step 607, the exact location of the Bluetooth-enabled transmitter 103 with respect to the Bluetooth-enabled device 101 is determined by fitting the second samples of the CTE signal into the signal model (equation 3), where the signal model connects the second samples of the CTE signal 105 with an unknown AoA of the CTE signal 105 received at times prescribed by the switching schedule and transmitted with an unknown ToF condition on the initial ToF data estimated at step 603. Further, the AoA and the ToF are used to pinpoint the exact location of the Bluetooth-enabled transmitter 103.

Figure 7:
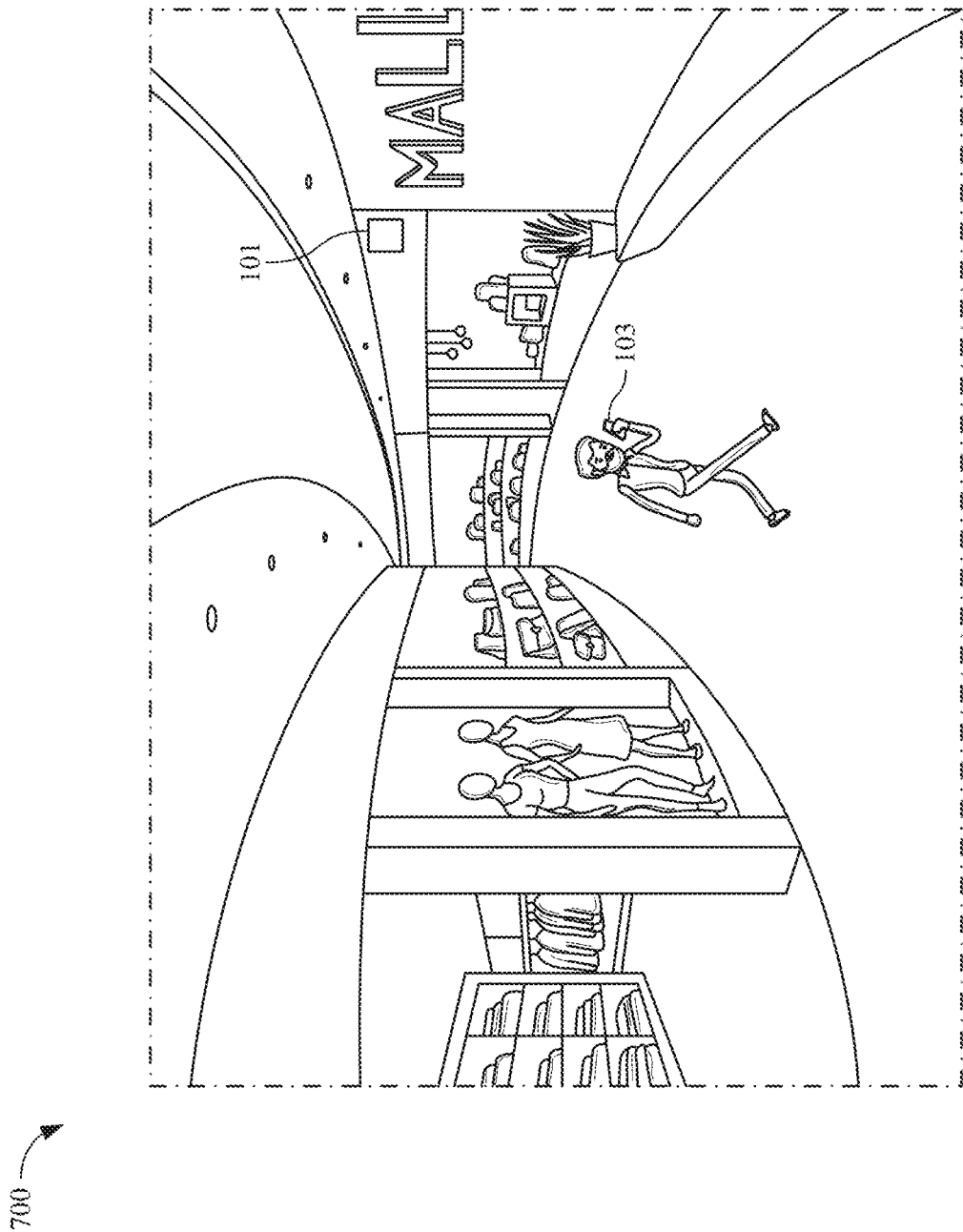
FIG. 7 illustrates a scenario where the Bluetooth-enabled device is used for indoor positioning of the Bluetooth-enabled transmitter, according to some embodiments.

FIG. 7 illustrates a scenario 700 where the Bluetooth-enabled device 101 is used for indoor positioning of the Bluetooth-enabled transmitter 103, according to an example embodiment. In FIG. 7, the Bluetooth-enabled transmitter 103 corresponds to a user device being used by a user 701 for determining direction to a desired shop inside a mall. The user device of the user 701 keeps broadcasting CTE signals. When the CTE signal broadcasted by the user device is detected by the Bluetooth-enabled device 101 fitted at a specific location in the mall, the Bluetooth-enabled device 101 determines an initial estimate of ToF data of the CTE signal received from the user device. The Bluetooth-enabled device 101 further demodulates the CTE signal and uses the signal model to determine AoA of the CTE signal. The signal model is initialized with the initial estimate of the ToF data of the CTE signal which not only refines final ToF calculation but also reduces search space for calculating ToF and AoA. The ToF of the CTE signal is indicative of distance of the user device from the Bluetooth-enabled device 101, and the AoA of the CTE signal is indicative of direction of the user device with respect to the location of the Bluetooth-enabled device 101. Based on the ToF and the AoA exact location of the user device is determined. Location information associated with the user device is then transmitted to the user device. In an example embodiment, the user device may be installed with an application configured to transmit the CTE signal and further convert the location information into a user understandable format.

In another embodiment, there may be more than one Bluetooth-enabled device 101 installed in the mall at different locations, where each Bluetooth-enabled device 101 is working independently of each other. When the user device is detected within the range of the Bluetooth-enabled device 101, the Bluetooth-enabled device 101 determines location of the user device with respect to the Bluetooth-enabled device 101. For example, there may be two Bluetooth-enabled devices in the mall, which are working independently. Therefore, if the user device is detected in the range of the first Bluetooth-enabled device 101, the first Bluetooth-enabled device 101 determines location of the user device with respect to the first Bluetooth-enabled device 101. Similarly, if the user device is detected in the range of the second Bluetooth-enabled device 101, the second Bluetooth-enabled device 101 determines location of the user device with respect to the second Bluetooth-enabled device 101.

In this manner, the systems and methods described herein provide for accurate indoor positioning systems based on already existing infrastructure of Bluetooth technology.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments.

However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A Bluetooth-enabled device comprising a transceiver, the transceiver comprising a plurality of antennas associated with a radiofrequency (RF) chain, the Bluetooth-enabled device further comprising:
at least one processor; and
a memory having instructions stored thereon that, when executed by the at least one processor, cause the Bluetooth-enabled device to:
control the RF chain during a first period to receive, at a single antenna selected from the plurality of antennas, a constant tone extension (CTE) signal of multiple frames transmitted by a Bluetooth-enabled transmitter over multiple frequencies prescribed in a Bluetooth communication protocol;
control the RF chain during a second period, to switch among the plurality of antennas, according to a switching schedule associated with reception of the CTE signal at each of the plurality of antennas over multiple frames;
determine, from first samples of the CTE signal received during the first period, an initial time-of-flight (ToF) data of the CTE signal, wherein the ToF data is indicative of a distance between the Bluetooth-enabled device and the Bluetooth-enabled transmitter, such that the distance is indicated using phase of the received CTE signal dependent on the ToF and the transmitted frequencies; and
localize the Bluetooth-enabled transmitter with respect to a location of the Bluetooth-enabled device by fitting second samples of the CTE signal received during the second period into a signal model connecting the second samples with an unknown angle-of-arrival of the CTE signal received at times prescribed by the switching schedule and transmitted with an unknown ToF conditioned on the initial ToF data.

2. The Bluetooth-enabled device of claim 1, wherein the CTE signal comprises a series of known symbols from the Bluetooth-enabled transmitter with no whitening, wherein a length associated with the CTE signal is variable, and wherein the CTE signal is a single-tone signal at an associated carrier-frequency.

3. The Bluetooth-enabled device of claim 1, wherein the first samples of the CTE signal and the second samples of the CTE signal are received over multiple paths, and wherein to determine the initial ToF data of the CTE signal from the first samples of the CTE signal, the at least one processor is further configured to:
demodulate the received first samples of the CTE signal; and
generate a virtual array of antennas based on the demodulated first samples of the CTE signal to determine the initial ToF data for each path of the multiple paths over each frequency of the multiple frequencies.

4. The Bluetooth-enabled device of claim 3, wherein to generate the virtual array of antennas, the at least one processor is configured to receive the CTE signal of multiple frames over the multiple frequencies and over the multiple paths.

5. The Bluetooth-enabled device of claim 1, wherein to recover the initial ToF data of the CTE signal from the first samples of the CTE signal, the at least one processor is further configured to determine cross-correlation between the received first samples of the CTE signal and a reference CTE signal.

6. The Bluetooth-enabled device of claim 1, wherein a duration of the first period corresponds to time required to recover the initial ToF data, and wherein a duration of the second period corresponds to time required to localize the Bluetooth-enabled transmitter with respect to the location of the Bluetooth-enabled device.

7. A method comprising:
controlling a radiofrequency (RF) chain corresponding to a plurality of antennas in a transceiver of a Bluetooth-enabled device, during a first period, to receive at a single antenna selected from the plurality of antennas, a constant tone extension (CTE) signal of multiple frames transmitted by a Bluetooth-enabled transmitter over multiple frequencies prescribed in a Bluetooth communication protocol;
controlling the RF chain during a second period to switch among the plurality of antennas according to a switching schedule, to receive the CTE signal at each of the plurality of antennas;
determining, from first samples of the CTE signal received during the first period, an initial time-of-flight (ToF) data of the CTE signal, wherein the ToF data is indicative of a distance between the Bluetooth-enabled device and the Bluetooth-enabled transmitter using phase of the CTE signal dependent on the ToF data and the transmitted frequencies; and
localizing the Bluetooth-enabled transmitter with respect to a location of the Bluetooth-enabled device by fitting second samples of the CTE signal received during the second period into a signal model connecting the second samples with an unknown angle-of-arrival of the CTE signal received at times prescribed by the switching schedule and transmitted with an unknown ToF conditioned on the initial ToF data.

8. The method of claim 7, wherein the CTE signal comprises a series of known symbols from the Bluetooth-enabled transmitter with no whitening, wherein a length associated with the CTE signal is variable, and wherein the CTE signal is a single-tone signal at an associated carrier-frequency.

9. The method of claim 7, wherein the first samples of the CTE signal and the second samples of the CTE signal are received over multiple paths, and wherein for determining the initial ToF data of the CTE signal from the first samples of the CTE signal, the method further comprises:
demodulating the received first samples of the CTE signal; and
generating a virtual array of antennas based on the demodulated first samples to determine the initial ToF data for each path of the multiple paths over each frequency of the multiple frequencies.

10. The method of claim 9, wherein for generating the virtual array of antennas, the method further comprises receiving the CTE signal of multiple frames over the multiple frequencies and over the multiple paths.

11. The method of claim 7, wherein for recovering the initial ToF data of the CTE signal from the first samples of the CTE signal, the method further comprises determining cross-correlation between the received first samples of the CTE signal and a reference CTE signal.

12. The method of claim 7, wherein a duration of the first period corresponds to time required to recover the initial ToF data, and wherein a duration of the second period corresponds to time required to localize the Bluetooth-enabled transmitter with respect to the location of the Bluetooth-enabled device.

* * * * *